United States Patent
Sugiyama et al.

(10) Patent No.: US 12,037,059 B2
(45) Date of Patent: Jul. 16, 2024

(54) STEERING CONTROL DEVICE

(71) Applicants: JTEKT CORPORATION, Kariya (JP); DENSO CORPORATION, Kariya (JP)

(72) Inventors: Satoshi Sugiyama, Chiryu (JP); Koichi Nakamura, Kariya (JP)

(73) Assignees: JTEKT CORPORATION, Kariya (JP); DENSO CORPORATION, Kariya (JP)

( * ) Notice: Subject to any disclaimer, the term of this patent is extended or adjusted under 35 U.S.C. 154(b) by 230 days.

(21) Appl. No.: 17/691,310

(22) Filed: Mar. 10, 2022

(65) Prior Publication Data
US 2022/0297743 A1    Sep. 22, 2022

(30) Foreign Application Priority Data
Mar. 16, 2021    (JP) ................................. 2021-042827

(51) Int. Cl.
*B62D 5/04*    (2006.01)
*B62D 15/02*    (2006.01)

(52) U.S. Cl.
CPC ......... *B62D 5/0463* (2013.01); *B62D 5/0412* (2013.01); *B62D 15/025* (2013.01)

(58) Field of Classification Search
CPC .. B62D 5/0463; B62D 5/0412; B62D 15/025; B62D 5/0481; B62D 5/0403; B62D 5/046
See application file for complete search history.

(56) References Cited

U.S. PATENT DOCUMENTS

2018/0244308 A1*    8/2018    Furukawa ............ B62D 5/0484
2019/0260324 A1     8/2019    Kuramitsu et al.

FOREIGN PATENT DOCUMENTS

| JP | 2001-010514 A | 1/2001 | |
| JP | 2018-130007 A | 8/2018 | |
| WO | WO-2018088465 A1 * | 5/2018 | ............... B62D 5/04 |

OTHER PUBLICATIONS

Machine Translation of WO2018088465A1 PDF File Name: "WO2018088465A1_Machine_Translation.pdf".*

* cited by examiner

*Primary Examiner* — Grant Moubry
*Assistant Examiner* — Ruben Picon-Feliciano
(74) *Attorney, Agent, or Firm* — Oliff PLC

(57) ABSTRACT

In a steering control device, a plurality of control systems is configured to switch a drive mode to a cooperative drive mode when command values calculated by control units of the control systems are not different from each other and to switch the drive mode to an independent drive mode when the command values calculated by the control units of the control systems are different from each other. The control systems are configured to gradually limit the command values respectively calculated by the control units of the control systems when a start switch of a vehicle has been turned off. The control systems are configured to switch the drive mode to the independent drive mode regardless of whether the command values calculated by the control units of the control systems are different from each other when the start switch has been turned off while the vehicle is traveling.

4 Claims, 6 Drawing Sheets

STEERING CONTROL DEVICE

CROSS-REFERENCE TO RELATED APPLICATION

This application claims priority to Japanese Patent Application No. 2021-042827 filed on Mar. 16, 2021, incorporated herein by reference in its entirety.

BACKGROUND

1. Technical Field

The disclosure relates to a steering control device.

2. Description of Related Art

Japanese Unexamined Patent Application Publication No. 2018-130007 (JP 2018-130007 A) discloses a steering control device that controls supply of electric power to a motor using two control systems including a master control system and a slave control system. In the steering control device, a master control unit that is provided in the master control system calculates a current command value, and a slave control unit that is provided in the slave control system calculates a current command value. The steering control device performs control in a cooperative drive mode in a normal state, that is, when it is determined that an abnormality in which the current command values of the control systems are different has not occurred, and performs control in an independent drive mode when it is determined that an abnormality in which the current command values of the control systems are different has occurred. When control is performed in the cooperative drive mode, the steering control device controls supply of electric power to both the master control system and the slave control system using the current command value calculated by the master control unit. When the independent drive mode is performed, the steering device controls supply of electric power to the master control system using the current command value calculated by the master control unit and controls supply of electric power to the slave control system using the current command value calculated by the slave control unit.

Japanese Unexamined Patent Application Publication No. 2001-10514 (JP 2001-10514 A) discloses a controller which is a steering control device that limits a calculated current command value in ignition-off control when an ignition switch is turned off. The steering control device gradually limits the current command value for a predetermined time. After the predetermined time has elapsed, the steering control device limits the current command value to zero and turns itself off by switching a power supply relay to a turned-off state.

SUMMARY

An ignition switch may be turned off while a vehicle is traveling. In the steering control device, a signal indicating that the ignition switch has been turned off while the vehicle is traveling is input to each of the control systems, and ignition-off control while the vehicle is traveling is performed by each of the control systems. Due to, for example, a difference between a timing at which the power supply relay provided in the master control system is switched to a turned-off state and a timing at which the power supply relay provided in the slave control system is switched to a turned-off state, one control system of the master control system and the slave control system may transition to traveling ignition-off control (i.e., control that is performed when the ignition switch has been turned off while the vehicle is traveling) earlier than the other control system. As a result, in the control system which has transitioned to the traveling ignition-off control earlier, the current command value calculated by the control unit of the control system is limited.

For example, when the master control system transitions to the traveling ignition-off control earlier than the slave control system, the current command value calculated by the master control unit is limited and the current command value calculated by the slave control unit is not limited. When a driver performs steering in the traveling ignition-off control, the master control unit and the slave control unit calculate current command values corresponding to the steering. In this case, since the current command value calculated by the master control unit is limited and the current command value calculated by the slave control unit is not limited, the current command value calculated by the master control unit and the current command value calculated by the slave control unit are different from each other. Accordingly, in the slave control system, it is determined that the limited current command value calculated by the master control unit and the non-limited current command value calculated by the slave control unit are different, and the drive mode is switched from the cooperative drive mode to the independent drive mode. Control for supply of electric power to the slave control system is switched from control using the limited current command value calculated by the master control unit to control using the non-limited current command value calculated by the slave control unit. Accordingly, a torque output from the motor may fluctuate.

A steering control device according to an aspect of the disclosure includes a plurality of control systems configured to control driving of a motor by switching between a plurality of drive modes including a cooperative drive mode and an independent drive mode. Each of the control systems includes a control unit configured to calculate a command value for controlling the motor. The control systems are configured to control the driving of the motor based on the command value calculated by the control unit of one control system of the control systems when the cooperative drive mode is performed. The control systems are configured to control the driving of the motor based on the command values respectively calculated by the control units of the control systems when the independent drive mode is performed. The control systems are configured to switch the drive mode to the cooperative drive mode when the command values calculated by the control units of the control systems are not different from each other and to switch the drive mode to the independent drive mode when the command values calculated by the control units of the control systems are different from each other. The control systems are configured to gradually limit the command values respectively calculated by the control units of the control systems when a start switch of a vehicle has been turned off. The control systems are configured to switch the drive mode to the independent drive mode regardless of whether the command values calculated by the control units of the control systems are different from each other when the start switch has been turned off while the vehicle is traveling.

When a start switch is turned off while a vehicle is traveling, the timing of transitioning to control that should be performed when the start switch is turned off while the vehicle is traveling may vary among the plurality of control systems. A control system that has transitioned earlier to the control that should be performed when the start switch is turned off while the vehicle is traveling gradually limits the command value calculated by the control unit of the control system, and another control system that has not transitioned yet to the control that should be performed when the start switch is turned off while the vehicle is traveling does not limit the command value calculated by the control unit of the other control system. With this configuration, when the start switch is turned off while the vehicle is traveling, the drive mode is switched from the cooperative drive mode to the independent drive mode regardless of whether the command values calculated by the control units of the control systems are different from each other. Accordingly, as compared to a case where the drive mode is switched from the cooperative drive mode to the independent drive mode after the command values calculated by the control units of the control systems have become different from each other, the control systems can be switched to the independent drive mode early. As a result, even when the command values are calculated by the control units of the control systems in the control performed when the start switch is turned off while the vehicle is traveling, it is possible to curb fluctuation of supply of electric power to the control systems. Accordingly, it is possible to curb fluctuation of a torque output from the motor when the start switch is turned off while the vehicle is traveling.

In the steering control device according to the aspect, the control systems may be configured to determine whether the start switch has been turned off while the vehicle is traveling. Each of the control systems may be configured to transmit information on the drive mode of the control system to each of a remainder of the control systems and to receive information on the drive mode of each of the remainder of the control systems. When one control system of the control systems switches the drive mode to the independent drive mode due to turning-off of the start switch while the vehicle is traveling, the one control system may transmit information on the drive mode indicating that the one control system has been switched to the independent drive mode to each of a remainder of the control systems, and each of the remainder of the control systems may receive the information on the drive mode from the one control system of the control systems, and may switch the drive mode to the independent drive mode based on the information on the drive mode received from the one control system.

Since the plurality of control systems independently determines whether the start switch has been turned off while the vehicle is traveling, the timing of transitioning to the control that should be performed when the start switch is turned off while the vehicle is traveling may vary among the plurality of control systems and the timing of switching to the independent drive mode may also vary among them. Each of the remainder of the control systems switches the drive mode to the independent drive mode based on the information on the drive mode received from the one control system. Accordingly, in comparison with a case in which each of the remainder of the control systems switches the drive mode to the independent drive mode after separately determining that the start switch has been turned off while the vehicle is traveling, it is possible to match the timings of switching to the independent drive mode among the plurality of control systems. As a result, it is possible to stabilize a torque output from the motor.

In the steering control device according to the aspect, the control systems may be configured to maintain the independent drive mode in a situation in which fluctuation of a torque of the motor due to switching of the drive mode is likely to cause a steering wheel to vibrate, and to switch the drive mode to the cooperative drive mode in a situation in which the fluctuation of the torque of the motor due to the switching of the drive mode is less likely to cause the steering wheel to vibrate, when the start switch is turned on in a period in which the drive mode is the independent drive mode due to turning-off of the start switch while the vehicle is traveling.

With this configuration, even when the start switch is turned on during the control that is performed when the start switch has been turned off while the vehicle is traveling, the plurality of control systems maintains the independent drive mode in the situation in which the fluctuation of the torque of the motor due to the switching of the drive mode is likely to cause the steering wheel to vibrate. In this case, since the plurality of control systems does not switch the drive mode, it is possible to curb fluctuation of the torque output from the motor. Accordingly, it is possible to reduce the possibility that the fluctuation of the torque affects a driver's steering feeling related to a steering wheel due to the steering wheel being caused to vibrate. When the start switch is turned on during the control that is performed when the start switch has been turned off while the vehicle is traveling, the plurality of control systems switches the drive mode to the cooperative drive mode in the situation in which the fluctuation of the torque of the motor due to the switching of the drive mode is less likely to cause the steering wheel to vibrate. In this case, the plurality of control systems can switch the drive mode to the cooperative drive mode in a state in which the fluctuation of the torque output from the motor is curbed.

In the steering control device according to the aspect, the control systems may be configured to determine that the fluctuation of the torque of the motor due to the switching of the drive mode is likely to cause the steering wheel to vibrate and to maintain the independent drive mode when the steering wheel is being steered. The control systems may be configured to determine that the fluctuation of the torque of the motor due to the switching of the drive mode is less likely to cause the steering wheel to vibrate and to switch the drive mode to the cooperative drive mode when the steering wheel is not being steered.

In this configuration, the case in which it is determined that the steering wheel is being steered is a situation in which the command value is likely to fluctuate when the drive mode is switched and is a situation in which the fluctuation of the torque output from the motor is likely to cause the steering wheel to vibrate. The case in which it is determined that the steering wheel is not being steered is a situation in which the command value is less likely to fluctuate when the drive mode is switched and is a situation in which the fluctuation of the torque output from the motor is less likely to cause the steering wheel to vibrate. In this way, by switching the drive mode based on whether the steering wheel is being steered, it is possible to appropriately switch the drive mode.

With the steering control device according to the aspect of the disclosure, it is possible to curb fluctuation of the torque output from the motor when the start switch has been turned off while the vehicle is traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
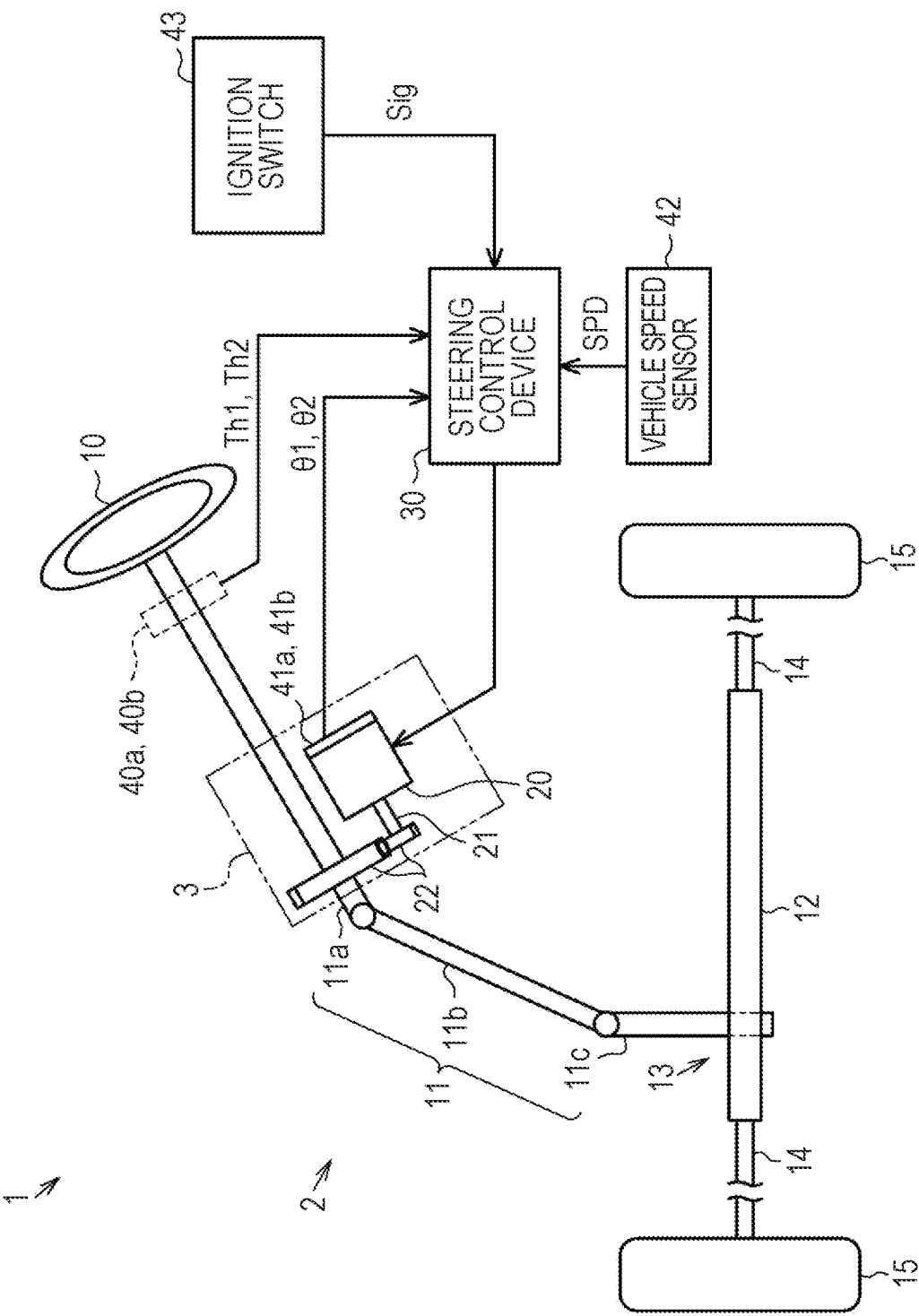
FIG. 1 is a diagram schematically illustrating a configuration of a steering system in which a steering control device according to an embodiment is provided.

Hereinafter, an embodiment in which a steering control device is applied to an electric power steering system (hereinafter referred to as an "EPS") will be described with reference to the accompanying drawings. As illustrated in FIG. 1, the EPS 1 includes a steering mechanism 2 that turns turning wheels 15 based on a driver's operation on a steering wheel 10, an assist mechanism 3 that assists the driver's steering operation, and a steering control device 30 that controls the assist mechanism 3.

The steering mechanism 2 includes a steering shaft 11 having one end fixed to the steering wheel 10 and the other end that has a pinion gear formed thereon, and a rack shaft 12 that has a rack gear formed thereon and engaging with the pinion gear. A rack and pinion mechanism 13 is constituted by the pinion gear and the rack gear. The steering shaft 11 includes a column shaft 11a that is connected to the steering wheel 10, an intermediate shaft 11b that is connected to a lower end of the column shaft 11a, and a pinion shaft 11c that is connected to a lower end of the intermediate shaft 11b. A pinion gear is formed at a lower end of the pinion shaft 11c. A rotational motion of the steering shaft 11 is converted to a reciprocating linear motion in an axial direction of the rack shaft 12 by the rack and pinion mechanism 13. The reciprocating linear motion of the rack shaft 12 is transmitted to the right and left turning wheels 15 via tie rods 14 respectively connected to both ends of the rack shaft 12, whereby a turning angle of the turning wheels 15 is changed and a travel direction of the vehicle is changed.

The assist mechanism 3 includes a motor 20 including a rotation shaft 21, and a speed reduction mechanism 22. The rotation shaft 21 of the motor 20 is connected to the column shaft 11a via the speed reduction mechanism 22. The speed reduction mechanism 22 reduces a rotational speed of the motor 20 and transmits the rotational force to the column shaft 11a after the rotational speed is reduced. That is, a driver's steering operation is assisted by applying a torque of the motor 20 to the steering shaft 11. For example, a three-phase brushless motor is employed as the motor 20. For example, a worm-gear mechanism is employed as the speed reduction mechanism 22.

Figure 2:
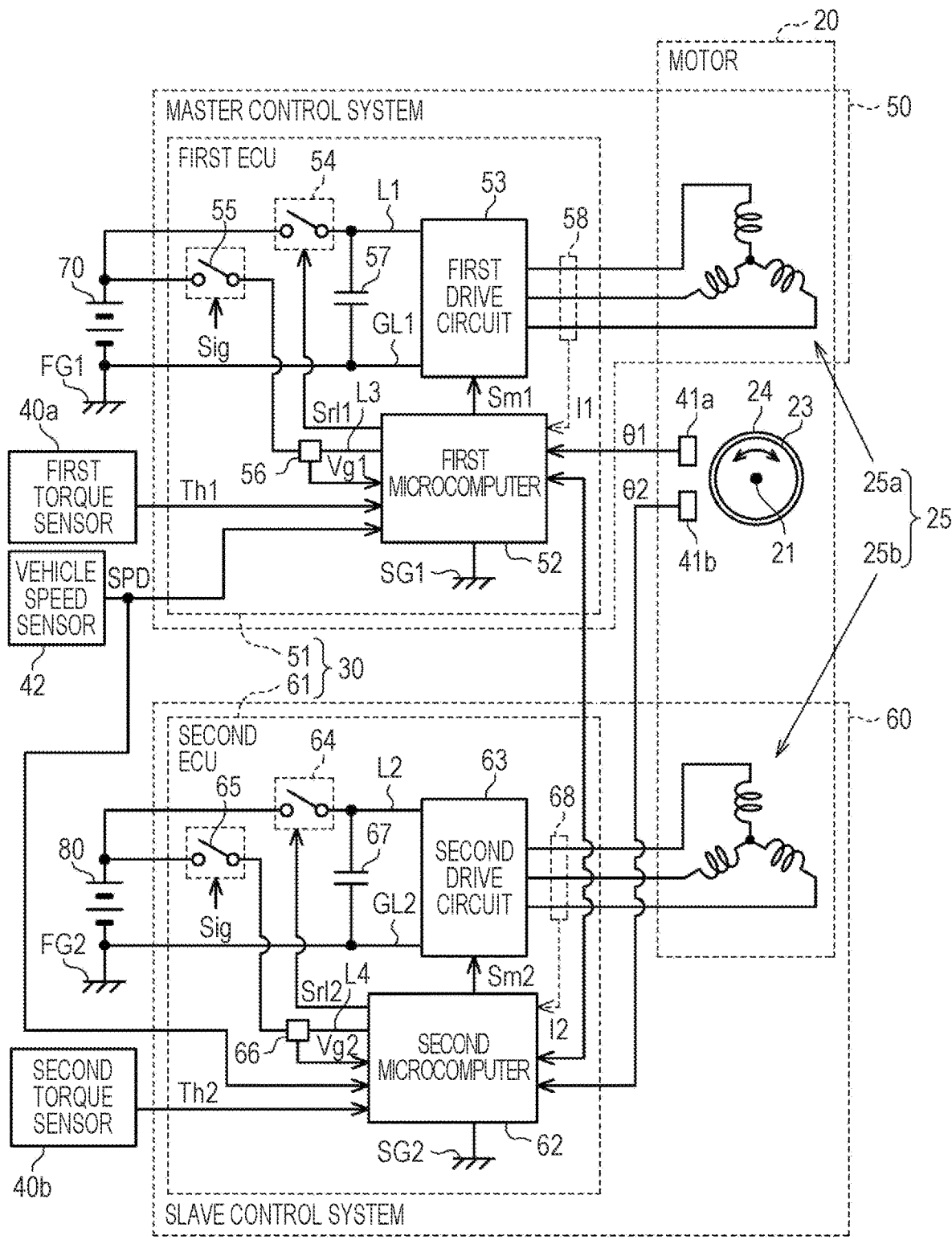
FIG. 2 is a block diagram schematically illustrating a configuration of the steering control device.

As illustrated in FIG. 2, the motor 20 includes a rotor 23 that rotates around the rotation shaft 21 and a stator 24 that is disposed outside the rotor 23. A permanent magnet is fixed to a surface of the rotor 23. In the permanent magnet, different polarities (an N pole and an S pole) are alternately arranged in a circumferential direction of the rotor 23. The permanent magnet forms a magnetic field when the motor 20 rotates. A three-phase coil 25 with a U phase, a V phase, and a W phase is arranged in a ring shape in the stator 24. The coil 25 includes a first coil 25a and a second coil 25b. Each of the first coil 25a and the second coil 25b includes U-phase, V-phase, and W-phase coils which are connected in a star shape. The steering control device 30 which is a control unit configured to control driving of the motor 20 is connected to the motor 20.

As illustrated in FIG. 1, various sensors provided in the vehicle are connected to the steering control device 30. As the various sensors, a first torque sensor 40a, a second torque sensor 40b, a first rotation angle sensor 41a, a second rotation angle sensor 41b, and a vehicle speed sensor 42 are provided in the vehicle. The first torque sensor 40a and the second torque sensor 40b are provided on the column shaft 11a. The first rotation angle sensor 41a and the second rotation angle sensor 41b are provided in the motor 20. The first torque sensor 40a detects a first steering torque Th1 that is applied to the steering shaft 11 due to a driver's steering operation. The second torque sensor 40b detects a second steering torque Th2 that is applied to the steering shaft 11 due to a driver's steering operation. The first rotation angle sensor 41a detects a first rotation angle θ1 of the rotation shaft 21 of the motor 20. The second rotation angle sensor 41b detects a second rotation angle θ2 of the rotation shaft 21 of the motor 20. The vehicle speed sensor 42 detects a vehicle speed SPD which is a travel speed of the vehicle. The motor 20 is a control target for the steering control device 30 and the steering control device 30 controls driving of the motor 20. Specifically, the steering control device 30 sets a target torque of the motor 20 which is applied to the steering mechanism 2 based on detection values from the various sensors, and controls a current which is supplied to the motor 20 such that an actual torque reaches the target torque. An ignition switch 43 which is a start switch configured to start a drive source of the vehicle is connected to the steering control device 30. An ignition signal Sig indicating turning-on/off of the ignition switch 43 is input to the steering control device 30. The ignition switch 43 outputs an ignition signal Sig corresponding to a driver's operation of the ignition switch 43.

The configuration of the steering control device 30 will be described below. As illustrated in FIG. 2, the steering control device 30 includes a master control system 50 having a first electronic control unit (hereinafter referred to as a "first ECU 51") that controls a current supplied to the first coil 25a of the motor 20 and a slave control system 60 having a second electronic control unit (hereinafter referred to as a "second ECU 61") that controls a current supplied to the second coil 25b of the motor 20.

The master control system 50 and the slave control system 60 control driving of the motor 20 by switching a drive mode between a cooperative drive mode and an independent drive mode. In the cooperative drive mode, supply of electric power to both the master control system 50 and the slave control system 60 is controlled based on a command value calculated by the first ECU 51 of the master control system 50. On the other hand, in the independent drive mode, supply of electric power to the master control system 50 is controlled based on a command value calculated by the first ECU 51 of the master control system 50, and supply of electric power to the slave control system 60 is controlled based on a command value calculated by the second ECU 61 of the slave control system 60. In this embodiment, it is assumed that the function of the master control system 50 and the function of the slave control system 60 are not exchanged. That is, in the cooperative drive mode, supply of electric power to both the master control system 50 and the slave control system 60 is not performed based on the command value calculated by the second ECU 61 of the slave control system 60.

The first ECU 51 of the master control system 50 includes a first microcomputer 52 that is a control unit, a first drive circuit 53, a first drive relay 54, a first power supply relay 55, a first voltage sensor 56, a first capacitor 57, and a first current sensor 58. The second ECU 61 of the slave control system 60 includes a second microcomputer 62 that is a control unit, a second drive circuit 63, a second drive relay 64, a second power supply relay 65, a second voltage sensor 66, a second capacitor 67, and a second current sensor 68. The first drive circuit 53 and the second drive circuit 63 have the same configuration. The first drive relay 54 and the second drive relay 64 have the same configuration. The first power supply relay 55 and the second power supply relay 65 have the same configuration. The first voltage sensor 56 and the second voltage sensor 66 have the same configuration. The first capacitor 57 and the second capacitor 67 have the same configuration. The first current sensor 58 and the second current sensor 68 have the same configuration. The first microcomputer 52 and the second microcomputer 62 have the same configuration except for a command value calculating unit which will be described later. The same configuration means that they have the same function and the same performance in the same design idea.

A first power supply 70 that is a source of a current supplied to the first coil 25a is connected to the first ECU 51. High-potential sides of the first drive circuit 53 and the first power supply 70 are connected to each other via a first power supply line L1. Low-potential sides of the first drive circuit 53 and the first power supply 70 are connected to each other via a first power-supply ground line GL1. The first power-supply ground line GL1 is connected to a first power-supply ground FG1. The first drive relay 54 is provided in the first power supply line L1. The first drive relay 54 is turned on and off based on a first relay signal Srl1 from the first microcomputer 52 such that the first power supply line L1 is switched between a connected state and a disconnected state. When the first power supply line L1 is in the connected state, electric power of the first power supply 70 is supplied to the first drive circuit 53 via the first power supply line L1. When the first power supply line L1 is in the disconnected state, electric power of the first power supply 70 is not supplied to the first drive circuit 53 via the first power supply line L1.

High-potential sides of the first microcomputer 52 and the first power supply 70 are connected to each other via a third power supply line L3. A low-potential side of the first microcomputer 52 is connected to a first internal ground SG1. The first power supply relay 55 that is turned on and off according to an ignition signal Sig output from the ignition switch 43 of the vehicle is provided in the third power supply line L3. The first power supply relay 55 switches the third power supply line L3 between a connected state and a disconnected state according to the ignition signal Sig. When the ignition signal Sig indicating that the ignition switch 43 is turned on is input to the first power supply relay 55, the first power supply relay 55 is turned on and the third power supply line L3 is switched to the connected state. When the third power supply line L3 is in the connected state, electric power of the first power supply 70 is supplied to the first microcomputer 52 via the third power supply line L3. When the ignition signal Sig indicating that the ignition switch 43 is turned off is input to the first power supply relay 55, the first power supply relay 55 is turned off and the third power supply line L3 is switched to the disconnected state. When the third power supply line L3 is in the disconnected state, electric power of the first power supply 70 is not supplied to the first microcomputer 52 via the third power supply line L3. The first voltage sensor 56 is provided in the third power supply line L3. The first voltage sensor 56 detects a voltage from the first power supply 70 generated in the third power supply line L3, as a first ignition voltage Vg1.

The first capacitor 57 is provided between a portion of the first power supply line L1 and the first power-supply ground line GL1, the portion of the first power supply line L1 being located between the first drive relay 54 and the first drive circuit 53. The first capacitor 57 smooths the voltage from the first power supply 70.

The first drive circuit 53 is a three-phase drive circuit corresponding to the three-phase first coil 25a. The first drive circuit 53 is configured as a known three-phase drive circuit in which three switching arms each including a pair of switching elements connected in series are connected in parallel. For example, a metal-oxide-semiconductor field-effect transistor (MOS-FET) is employed as each switching element. An upstream switching element of each pair of switching elements connects and disconnects the high-potential side of the first power supply 70 and the first coil 25a. A downstream switching element of each pair of switching elements connects and disconnects the low-potential side of the first power supply 70 and the first coil 25a.

The first current sensor 58 detects a first actual current value I1 that is a value of a phase current flowing in a power supply path between the first drive circuit 53 and the first coil 25a. The first microcomputer 52 outputs a first motor control signal Sm1 for controlling driving of the first drive circuit 53 and outputs a first relay signal Srl1 for controlling the first drive relay 54, using electric power which is supplied from the first power supply 70 via the third power supply line L3. The first microcomputer 52 generates a PWM signal for designating turning-on/off of the switching elements in the first drive circuit 53, as the first motor control signal Sm1.

A second power supply 80 that is a source of a current supplied to the second coil 25b is connected to the second ECU 61. High-potential sides of the second drive circuit 63 and the second power supply 80 are connected to each other via a second power supply line L2. Low-potential sides of the second drive circuit 63 and the second power supply 80 are connected to each other via a second power-supply ground line GL2. The second power-supply ground line GL2 is connected to a second power-supply ground FG2. The second drive relay 64 is provided in the second power supply line L2. The second drive relay 64 is turned on and off based on a second relay signal Srl2 from the second microcomputer 62 such that the second power supply line L2 is switched between a connected state and a disconnected state. When the second power supply line L2 is in the connected state, electric power of the second power supply 80 is supplied to the second drive circuit 63 via the second power supply line L2. When the second power supply line L2 is in the disconnected state, electric power of the second power supply 80 is not supplied to the second drive circuit 63 via the second power supply line L2.

High-potential sides of the second microcomputer 62 and the second power supply 80 are connected to each other via a fourth power supply line L4. A low-potential side of the second microcomputer 62 is connected to a second internal ground SG2. The second power supply relay 65 that is turned on and off according to an ignition signal Sig output from the ignition switch 43 of the vehicle is provided in the fourth power supply line L4. The second power supply relay 65 switches the fourth power supply line L4 between a connected state and a disconnected state according to the ignition signal Sig. When the ignition signal Sig indicating that the ignition switch 43 is turned on is input to the second power supply relay 65, the second power supply relay 65 is turned on and the fourth power supply line L4 is switched to the connected state. When the fourth power supply line L4 is in the connected state, electric power of the second power supply 80 is supplied to the second microcomputer 62 via the fourth power supply line L4. When the ignition signal Sig indicating that the ignition switch 43 is turned off is input to the second power supply relay 65, the second power supply relay 65 is turned off and the fourth power supply line L4 is switched to the disconnected state. When the fourth power supply line L4 is in the disconnected state, electric power of the second power supply 80 is not supplied to the second microcomputer 62 via the fourth power supply line L4. The second voltage sensor 66 is provided in the fourth power supply line L4. The second voltage sensor 66 detects a voltage from the second power supply 80 generated in the fourth power supply line L4, as a second ignition voltage Vg2.

The second capacitor 67 is provided between a portion of the second power supply line L2 and the second power-supply ground line GL2, the portion of the second power supply line L2 being located between the second drive relay 64 and the second drive circuit 63. The second capacitor 67 smooths the voltage from the second power supply 80.

Each of the first power-supply ground FG1 and the second power-supply ground FG2 is a portion with a potential almost equal to that of the ground. In this embodiment, the first power-supply ground FG1 and the second power-supply ground FG2 are in a body of the vehicle in which the steering control device 30 is mounted. Each of the first internal ground SG1 and the second internal ground SG2 is a portion serving as a reference for a voltage in an electric circuit of the corresponding ECU. The first internal ground SG1 and the second internal ground SG2 are provided on a board on which the steering control device 30 is mounted.

In this way, different power supplies are connected to the first ECU 51 and the second ECU 61 via different power supply lines and different power-supply ground lines. Accordingly, in this embodiment, the control systems configured to control driving of the motor 20 are redundant, and the configurations of the power supplies are redundant.

The second drive circuit 63 is a three-phase drive circuit corresponding to the three-phase second coil 25b. The second drive circuit 63 is configured as a known three-phase drive circuit in which three switching arms each including a pair of switching elements connected in series are connected in parallel. An upstream switching element of each pair of switching elements connects and disconnects the high-potential side of the second power supply 80 and the second coil 25b. A downstream switching element of each pair of switching elements connects and disconnects the low-potential side of the second power supply 80 and the second coil 25b.

The second current sensor 68 detects a second actual current value I2 that is a value of a phase current flowing in a power supply path between the second drive circuit 63 and the second coil 25b. The second microcomputer 62 outputs a second motor control signal Sm2 for controlling driving of the second drive circuit 63 and outputs a second relay signal Srl2 for controlling the second drive relay 64, using electric power which is supplied from the second power supply 80 via the fourth power supply line L4. The second microcomputer 62 generates a PWM signal for designating turning-on/off of the switching elements in the second drive circuit 63, as the second motor control signal Sm2.

Figure 3:
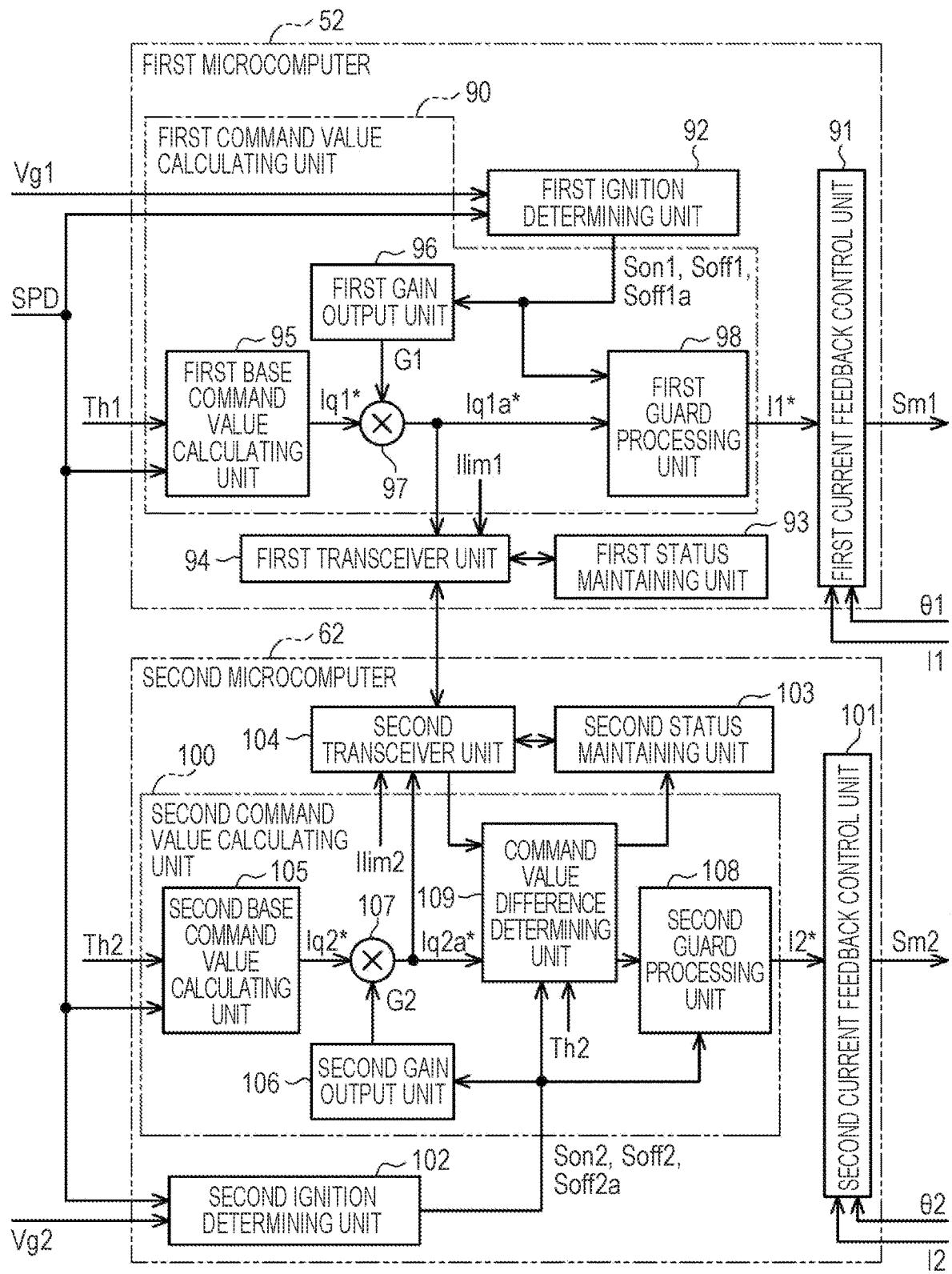
FIG. 3 is a block diagram schematically illustrating a configuration of a first microcomputer and a second microcomputer.

The functions of the first microcomputer 52 and the second microcomputer 62 will be described below. As illustrated in FIG. 3, the first microcomputer 52 includes a first command value calculating unit 90, a first current feedback control unit 91, a first ignition determining unit 92, a first status maintaining unit 93, and a first transceiver unit 94. The second microcomputer 62 includes a second command value calculating unit 100, a second current feedback control unit 101, a second ignition determining unit 102, a second status maintaining unit 103, and a second transceiver unit 104. The first current feedback control unit 91 and the second current feedback control unit 101 have the same configuration. The first ignition determining unit 92 and the second ignition determining unit 102 have the same configuration. The first status maintaining unit 93 and the second status maintaining unit 103 have the same configuration. The first transceiver unit 94 and the second transceiver unit 104 have the same configuration. The first command value calculating unit 90 and the second command value calculating unit 100 are different in configuration in that the second command value calculating unit 100 includes a command value difference determining unit 109 which will be described later but the first command value calculating unit 90 does not include the command value difference determining unit 109.

The first command value calculating unit 90 acquires the first steering torque Th1 detected by the first torque sensor 40a, the vehicle speed SPD detected by the vehicle speed sensor 42, and the signal generated by the first ignition determining unit 92. The first command value calculating unit 90 calculates a first final current command value I1* which is a target value of the first actual current value I1 based on the first steering torque Th1, the vehicle speed SPD, and the signal generated by the first ignition determining unit 92.

The first current feedback control unit 91 acquires the first final current command value I1* calculated by the first command value calculating unit 90, the first rotation angle θ1 detected by the first rotation angle sensor 41a, and the first actual current value I1 detected by the first current sensor 58. The first current feedback control unit 91 generates the first motor control signal Sm1 by performing current feedback control based on a difference between the first final current command value I1* and the first actual current value I1 such that the first actual current value I1 conforms to the first final current command value I1* based on the first actual current value I1 and the first rotation angle θ1.

The first ignition determining unit 92 acquires the first ignition voltage Vg1 detected by the first voltage sensor 56 and the vehicle speed SPD detected by the vehicle speed sensor 42. The first ignition determining unit 92 determines a state of the ignition switch 43 of the vehicle based on the first ignition voltage Vg1 and the vehicle speed SPD. Specifically, when the first ignition voltage Vg1 is higher than a voltage threshold value V0, the first ignition determining unit 92 determines that the ignition switch 43 has been turned on and generates a first ignition-on signal Son1. The voltage threshold value V0 is set to a minimum value of the first ignition voltage Vg1 supplied from the first power supply 70 via the third power supply line L3 illustrated in FIG. 2 when the ignition switch 43 is turned on. When a situation in which the first ignition voltage Vg1 is not higher than the voltage threshold value V0 is maintained for a predetermined time tg, the first ignition determining unit 92 determines that the ignition switch 43 has been turned off and generates a first ignition-off signal Soff1. When the vehicle is traveling in the situation in which the first ignition-off signal Soff1 is generated, the first ignition determining unit 92 generates a first traveling ignition-off signal Soff1a. That is, when a situation in which the vehicle speed SPD is higher than a vehicle speed threshold value SPD0 is maintained for the predetermined time tg and the situation in which the first ignition voltage Vg1 is not higher than the voltage threshold value V0 is maintained for the predetermined time tg, the first ignition determining unit 92 determines that the ignition switch 43 has been turned off while the vehicle is traveling and generates the first traveling ignition-off signal Soff1a. The vehicle speed threshold value SPD0 is set to a vehicle speed SPD at which the vehicle can be determined to be traveling.

The first status maintaining unit 93 maintains the drive mode of the master control system 50. That is, the first status maintaining unit 93 maintains information on the drive mode indicating that the master control system 50 controls driving of the motor 20 in the cooperative drive mode or information on the drive mode indicating that the master control system 50 controls driving of the motor 20 in the independent drive mode. The first status maintaining unit 93 ascertains (determines) the drive mode of the master control system 50, for example, based on the signal generated by the first ignition determining unit 92 or the information received from the first transceiver unit 94.

The first transceiver unit 94 transmits and receives information to and from the second transceiver unit 104 of the second microcomputer 62 which will be described later. The second command value calculating unit 100 acquires the second steering torque Th2 detected by the second torque sensor 40b, the vehicle speed SPD detected by the vehicle speed sensor 42, and the signal generated by the second ignition determining unit 102. The second command value calculating unit 100 calculates a second final current command value I2* which is a target value of the second actual current value I2, based on the second steering torque Th2, the vehicle speed SPD, and the signal generated by the second ignition determining unit 102.

The second current feedback control unit 101 acquires the second final current command value I2* calculated by the second command value calculating unit 100, the second rotation angle θ2 detected by the second rotation angle sensor 41b, and the second actual current value I2 detected by the second current sensor 68. The second current feedback control unit 101 generates the second motor control signal Sm2 by performing current feedback control based on a difference between the second final current command value I2* and the second actual current value I2 such that the second actual current value I2 conforms to the second final current command value I2* based on the second actual current value I2 and the second rotation angle θ2.

The second ignition determining unit 102 acquires the second ignition voltage Vg2 detected by the second voltage sensor 66 and the vehicle speed SPD detected by the vehicle speed sensor 42. The second ignition determining unit 102 determines a state of the ignition switch 43 of the vehicle based on the second ignition voltage Vg2 and the vehicle speed SPD. The method of determining the state of the ignition switch 43 of the vehicle which is performed by the second ignition determining unit 102 is the same as the determination method which is performed by the first ignition determining unit 92. Accordingly, the second ignition determining unit 102 generates a second ignition-on signal Son2, a second ignition-off signal Soff2, and a second traveling ignition-off signal Soff2a.

The second status maintaining unit 103 maintains the drive mode of the slave control system 60. That is, the second status maintaining unit 103 maintains information on the drive mode indicating that the slave control system 60 controls driving of the motor 20 in the cooperative drive mode or information on the drive mode indicating that the slave control system 60 controls driving of the motor 20 in the independent drive mode.

The second transceiver unit 104 transmits and receives information to and from the first transceiver unit 94 of the first microcomputer 52. The functions of the first command value calculating unit 90 and the second command value calculating unit 100 will be described below.

As illustrated in FIG. 3, the first command value calculating unit 90 includes a first base command value calculating unit 95, a first gain output unit 96, a multiplier 97, and a first guard processing unit 98. The second command value calculating unit 100 includes a second base command value calculating unit 105, a second gain output unit 106, a multiplier 107, a second guard processing unit 108, and a command value difference determining unit 109. The first base command value calculating unit 95 and the second base command value calculating unit 105 have the same configuration. The first gain output unit 96 and the second gain output unit 106 have the same configuration. The multiplier 97 and the multiplier 107 have the same configuration. The first guard processing unit 98 and the second guard processing unit 108 have the same configuration.

The vehicle speed SPD and the first steering torque Th1 are input to the first base command value calculating unit 95. The first base command value calculating unit 95 calculates a first base current command value Iq1* which is a current command value on the q axis in the d-q coordinate system, based on the vehicle speed SPD and the first steering torque Th1. The first base command value calculating unit 95 calculates the first base current command value Iq1* such that the absolute value thereof increases as the absolute value of the first steering torque Th1 increases and as the vehicle speed SPD decreases. The first base command value calculating unit 95 sets a current command value on the d axis in the d-q coordinate system to "0."

A signal generated by the first ignition determining unit 92 is input to the first gain output unit 96. The first gain output unit 96 outputs a first gain G1 in a range of 0 to 1 based on the signal generated by the first ignition determining unit 92. When the first ignition-on signal Son1 or the first ignition-off signal Soff1 is input from the first ignition determining unit 92, the first gain output unit 96 outputs "1" as the first gain G1. When the first traveling ignition-off signal Soff1a is input from the first ignition determining unit 92, the first gain output unit 96 outputs a value equal to or less than "1" as the first gain G1 in the traveling ignition-off control.

Figure 4:
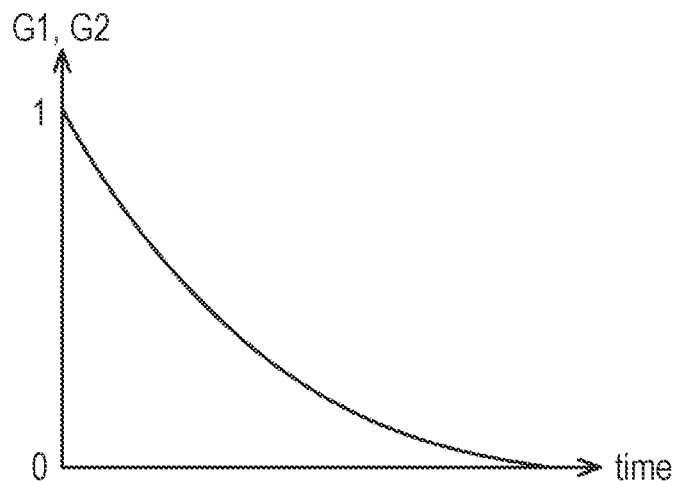
FIG. 4 is a graph illustrating time-dependent changes of a first gain and a second gain which are calculated by a gain calculating unit when a traveling ignition-off signal is input.

FIG. 4 illustrates time-dependent changes of the first gain G1 output from the first gain output unit 96 when the first traveling ignition-off signal Soff1a is input from the first ignition determining unit 92. In FIG. 4, time "0" indicates a time at which an assistance duration D1 in which a driver's steering operation is to be assisted (i.e., a driver's steering operation should be assisted) has elapsed after the first traveling ignition-off signal Soff1a has been input from the first ignition determining unit 92 to the first gain output unit 96. The assistance duration D1 is a predetermined period in which a driver's steering operation is to be assisted because there is a high likelihood of a driver's steering operation being performed immediately after the ignition switch 43 has been turned off. As illustrated in FIG. 4, the first gain output unit 96 outputs the first gain G1 such that the absolute value thereof decreases as time elapses after the assistance duration D1 has elapsed. That is, the first gain output unit 96 gradually decreases the absolute value of the first gain G1 after the assistance duration D1 has elapsed. The absolute value of the first gain G1 decreases exponentially after the assistance duration D1 has elapsed. When a predetermined time elapses after the assistance duration D1 has elapsed, the first gain output unit 96 outputs the first gain G1 as "0."

The first base current command value Iq1* calculated by the first base command value calculating unit 95 and the first gain G1 output from the first gain output unit 96 are input to the multiplier 97. The multiplier 97 calculates a first adjusted current command value Iq1a* which is a value obtained by multiplying the first base current command value Iq1* by the first gain G1. When the first ignition-on signal Son1 or the first ignition-off signal Soff1 is generated by the first ignition determining unit 92, the first base current command value Iq1* and the first adjusted current command value Iq1a* become the same. On the other hand, when the first traveling ignition-off signal Soff1a is generated by the first ignition determining unit 92, the absolute value of the first adjusted current command value Iq1a* is equal to or less than the absolute value of the first base current command value Iq1*. That is, when the first traveling ignition-off signal Soff1a is generated by the first ignition determining unit 92, the absolute value of the first adjusted current command value Iq1a* is gradually limited.

The first adjusted current command value Iq1a* calculated by the multiplier 97 and the signal generated by the first ignition determining unit 92 are input to the first guard processing unit 98. The first guard processing unit 98 calculates a first final current command value I1* obtained by limiting the first adjusted current command value Iq1a* to a first current limit value Ilim1 by performing various guard processes on the first adjusted current command value Iq1a*. As the various guard processes, for example, control for limiting the first adjusted current command value Iq1a* when the ignition switch 43 is turned off or control for limiting the first adjusted current command value Iq1a* to protect the master control system 50 from overheating is performed. The first current limit value Ilim1 is set according to the various guard processes and is set to a minimum value on a moment-to-moment basis. For example, when the first ignition-off signal Soff1 is input from the first ignition determining unit 92, the first guard processing unit 98 sets the first current limit value Ilim1 to substantially zero after a period in which a driver's steering operation is to be assisted has elapsed after the first ignition-off signal Soff1 has been input. In this case, the period in which a driver's steering operation is to be assisted is a predetermined period in which a driver's steering operation is to be assisted because there is a high likelihood of a driver's steering being performed immediately after the ignition switch 43 has been turned off, and is a period which is set to be longer than the assistance duration D1. The absolute value of the first current limit value Ilim1 is set to decrease gradually after the period in which a driver's steering operation is to be assisted has elapsed.

The first transceiver unit 94 acquires the first adjusted current command value Iq1a* calculated by the multiplier 97, the first current limit value Ilim1 used by the first guard processing unit 98, and information on the drive mode of the master control system 50 which is maintained in the first status maintaining unit 93. The first transceiver unit 94 transmits the first adjusted current command value Iq1a*, the first current limit value Ilim1, and the information on the drive mode of the master control system 50 to the second transceiver unit 104 of the slave control system 60 every predetermined control cycle.

The vehicle speed SPD and the second steering torque Th2 are input to the second base command value calculating unit 105. The second base command value calculating unit 105 calculates a second base current command value Iq2* which is a current command value on the q axis in the d-q coordinate system, based on the vehicle speed SPD and the second steering torque Th2. The second base command value calculating unit 105 calculates the second base current command value Iq2* such that the absolute value thereof increases as the absolute value of the second steering torque Th2 increases and as the vehicle speed SPD decreases. The second base command value calculating unit 105 sets a current command value on the d axis in the d-q coordinate system to "0."

A signal generated by the second ignition determining unit 102 is input to the second gain output unit 106. When the second ignition-on signal Son2 or the second ignition-off signal Soff2 is input from the second ignition determining unit 102, the second gain output unit 106 outputs "1" as the second gain G2. When the second traveling ignition-off signal Soff2a is input, the second gain output unit 106 outputs a value equal to or less than "1" as the second gain G2 in the traveling ignition-off control. As illustrated in FIG. 4, the second gain output unit 106 outputs the second gain G2 such that the absolute value thereof decreases as time elapses after the assistance duration D1 has elapsed. That is, the second gain output unit 106 gradually decreases the absolute value of the second gain G2 after the assistance duration D1 has elapsed. When a predetermined time elapses after the assistance duration D1 has elapsed, the second gain output unit 106 outputs the second gain G2 as "0."

The second base current command value Iq2* calculated by the second base command value calculating unit 105 and the second gain G2 output from the second gain output unit 106 are input to the multiplier 107. The multiplier 107 calculates a second adjusted current command value Iq2a* which is a value obtained by multiplying the second base current command value Iq2* by the second gain G2. When the second ignition-on signal Son2 or the second ignition-off signal Soff2 is generated by the second ignition determining unit 102, the second base current command value Iq2* and the second adjusted current command value Iq2a* become the same. On the other hand, when the second traveling ignition-off signal Soff2a is generated by the second ignition determining unit 102, the absolute value of the second adjusted current command value Iq2a* is equal to or less than the absolute value of the second base current command value Iq2*. That is, when the second traveling ignition-off signal Soff2a is generated by the second ignition determining unit 102, the absolute value of the second adjusted current command value Iq2a* is gradually limited.

The second adjusted current command value Iq2a* calculated by the multiplier 107, the first adjusted current command value Iq1a* received from the first transceiver unit 94 by the second transceiver unit 104, the drive mode of the master control system 50, and the second steering torque Th2 detected by the second torque sensor 40b are input to the command value difference determining unit 109. The command value difference determining unit 109 determines whether the first adjusted current command value Iq1a* and the second adjusted current command value Iq2a* are different from each other, based on a result of determination about whether a command value difference ΔI* between the first adjusted current command value Iq1a* and the second adjusted current command value Iq2a* is greater than a difference determination threshold value ΔI0. The difference determination threshold value ΔI0 is set to a value at which the first adjusted current command value Iq1a* and the second adjusted current command value Iq2a* can be considered to match each other and is set to a value at which the command value difference ΔI* is not greater than (i.e., does not exceed) the difference determination threshold value ΔI0 when the master control system 50 and the slave control system 60 are normal.

When the first adjusted current command value Iq1a* and the second adjusted current command value Iq2a* are not different from each other, that is, when an abnormality in which the adjusted current command values are different from each other does not occur between the master control system 50 and the slave control system 60, the command value difference determining unit 109 performs the cooperative drive mode. When the cooperative drive mode is performed, the command value difference determining unit 109 outputs the first adjusted current command value Iq1a* to the second guard processing unit 108. When the cooperative drive mode is performed, the command value difference determining unit 109 outputs a signal indicating that the cooperative drive mode is performed, to the second status maintaining unit 103.

When the first adjusted current command value Iq1a* and the second adjusted current command value Iq2a* are different from each other, that is, when an abnormality in which the adjusted current command values are different from each other occurs between the master control system 50 and the slave control system 60, the command value difference determining unit 109 performs the independent drive mode. When the independent drive mode is performed, the command value difference determining unit 109 outputs the second adjusted current command value Iq2a* to the second guard processing unit 108. When the independent drive mode is performed, the command value difference determining unit 109 outputs a signal indicating that the independent drive mode is performed, to the second status maintaining unit 103. The command value difference determining unit 109 switches the drive mode of the slave control system 60 by changing the adjusted current command value output to the second guard processing unit 108 based on the determination result regarding the difference between the adjusted current command values. In a period in which the independent drive mode is performed as the traveling ignition-off control, the command value difference determining unit 109 does not determine whether the first adjusted current command value Iq1a* and the second adjusted current command value Iq2a* are different from each other.

The first adjusted current command value Iq1a* or the second adjusted current command value Iq2a* output from the command value difference determining unit 109 and a signal generated by the second ignition determining unit 102 are input to the second guard processing unit 108. The second guard processing unit 108 calculates a second final current command value I2* in which the first adjusted current command value Iq1a* or the second adjusted current command value Iq2a* is limited to a second current limit value Ilim2 by performing various guard processes on the first adjusted current command value Iq1a* or the second adjusted current command value Iq2a*. As the various guard processes, for example, control for limiting the second adjusted current command value Iq2a* when the ignition switch 43 is turned off or control for limiting the second adjusted current command value Iq2a* to protect the slave control system 60 from overheating is performed. The second current limit value Ilim2 is set according to the various guard processes and is set to a minimum value on a moment-to-moment basis. For example, when the second ignition-off signal Soff2 is input from the second ignition determining unit 102, the second guard processing unit 108 sets the second current limit value Ilim2 to substantially zero after a period in which a driver's steering operation is to be assisted has elapsed after the second ignition-off signal Soff2 has been input. In this case, the period in which a driver's steering operation is to be assisted is a predetermined period in which a driver's steering operation is to be assisted because there is a high likelihood of a driver's steering being performed immediately after the ignition switch 43 has been turned off, and is a period which is set to be longer than the assistance duration D1. The absolute value of the second current limit value Ilim2 is set to decrease gradually after the period in which a driver's steering operation is to be assisted has elapsed.

A signal generated by the second ignition determining unit 102 is input to the command value difference determining unit 109. When the second traveling ignition-off signal Soff2a is input from the second ignition determining unit 102, the command value difference determining unit 109 switches the drive mode of the slave control system 60 from the cooperative drive mode to the independent drive mode regardless of whether the first adjusted current command value Iq1a* and the second adjusted current command value Iq2a* are different from each other. That is, the command value difference determining unit 109 outputs the second adjusted current command value Iq2a* to the second guard processing unit 108 such that the drive mode of the slave control system 60 is switched from the cooperative drive mode to the independent drive mode.

The process of switching the drive mode of the slave control system 60 will be described below with reference to FIG. 5. This description is based on the premise that the cooperative drive mode is being performed in the slave control system 60. The slave control system 60 repeatedly performs the following drive mode switching process. For the purpose of simplification of explanation, description of determination regarding the difference between the adjusted current command values in the command value difference determining unit 109 will be omitted.

Figure 5:
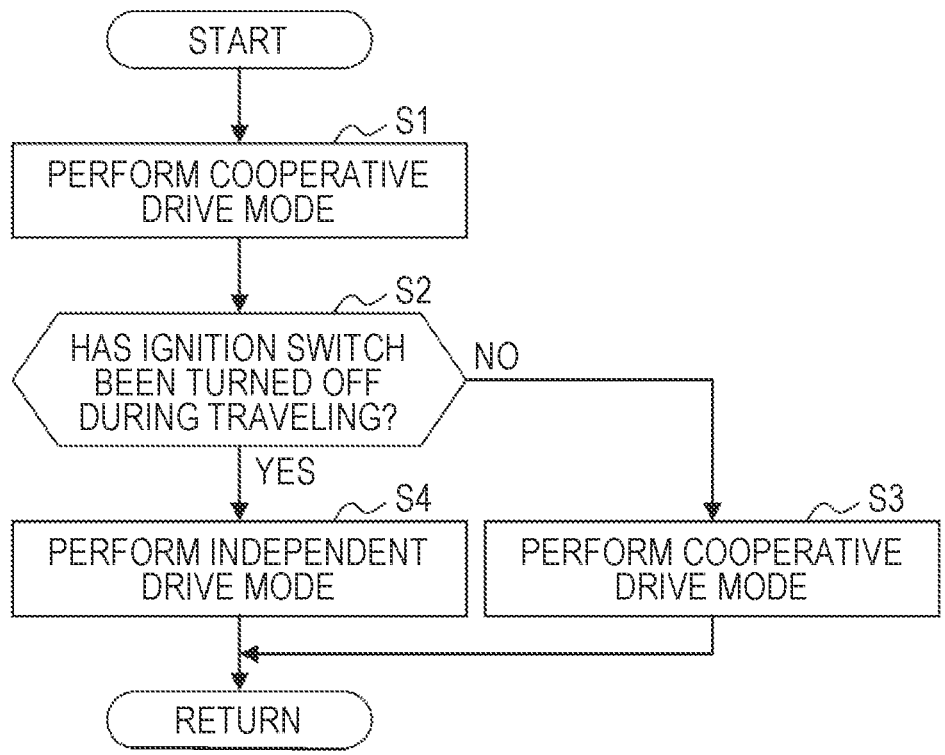
FIG. 5 is a flowchart illustrating a routine of a drive mode switching process in a slave control system.

As illustrated in FIG. 5, the second ignition determining unit 102 of the slave control system 60 determines whether the ignition switch 43 has been turned off while the vehicle is traveling (Step S2) when the cooperative drive mode is being performed (Step S1). When a situation in which the vehicle speed SPD is greater than the vehicle speed threshold value SPD0 is maintained for a predetermined time tg and a situation in which the second ignition voltage vg2 is not greater than the voltage threshold value V0 is maintained for the predetermined time tg, the second ignition determining unit 102 determines that the ignition switch 43 has been turned off while the vehicle is traveling and generates the second traveling ignition-off signal Soff2a.

When the ignition switch 43 has not been turned off while the vehicle is traveling (NO in Step S2), the command value difference determining unit 109 of the slave control system 60 performs the cooperative drive mode (Step S3) and ends the drive mode switching process. When the cooperative drive mode is performed, the command value difference determining unit 109 outputs the first adjusted current command value Iq1a* to the second guard processing unit 108 and outputs a signal indicating that the cooperative drive mode is performed, to the second status maintaining unit 103.

When the ignition switch 43 has been turned off while the vehicle is traveling (YES in Step S2), the command value difference determining unit 109 of the slave control system 60 performs the independent drive mode (Step S4) and ends the drive mode switching process. When the independent drive mode is performed, the command value difference determining unit 109 outputs the second adjusted current command value Iq2a* to the second guard processing unit 108 and outputs a signal indicating that the independent drive mode is performed, to the second status maintaining unit 103.

As illustrated in FIG. 3, the second transceiver unit 104 acquires the second adjusted current command value Iq2a* calculated by the multiplier 107, the second current limit value Ilim2 used in the second guard processing unit 108, and information on the drive mode of the slave control system 60 maintained in the second status maintaining unit 103. The second transceiver unit 104 transmits the second adjusted current command value Iq2a*, the second current limit value Ilim2, and the information on the drive mode of the slave control system 60 to the first transceiver unit 94 of the master control system 50 every predetermined control cycle. The second transceiver unit 104 receives the first adjusted current command value Iq1a*, the first current limit value Ilim1, and the information on the drive mode of the master control system 50 every predetermined control cycle. The first transceiver unit 94 receives the second adjusted current command value Iq2a*, the second current limit value Ilim2, and the information on the drive mode of the slave control system 60 every predetermined control cycle.

When the first transceiver unit 94 receives a signal indicating the independent drive mode from the second transceiver unit 104, the master control system 50 switches its own drive mode to the independent drive mode. In this embodiment, the master control system 50 outputs the first adjusted current command value Iq1a* to the first guard processing unit 98 and does not change any control result in both the cooperative drive mode and the independent drive mode. Here, the master control system 50 can change various kinds of control of the master control system 50 based on information of the slave control system 60 by acquiring the information of the slave control system 60.

The drive mode switching process when it is determined in the slave control system 60 earlier than in the master control system 50 that the ignition switch 43 has been turned off while the vehicle is traveling will be described below with reference to FIG. 6.

Figure 6:
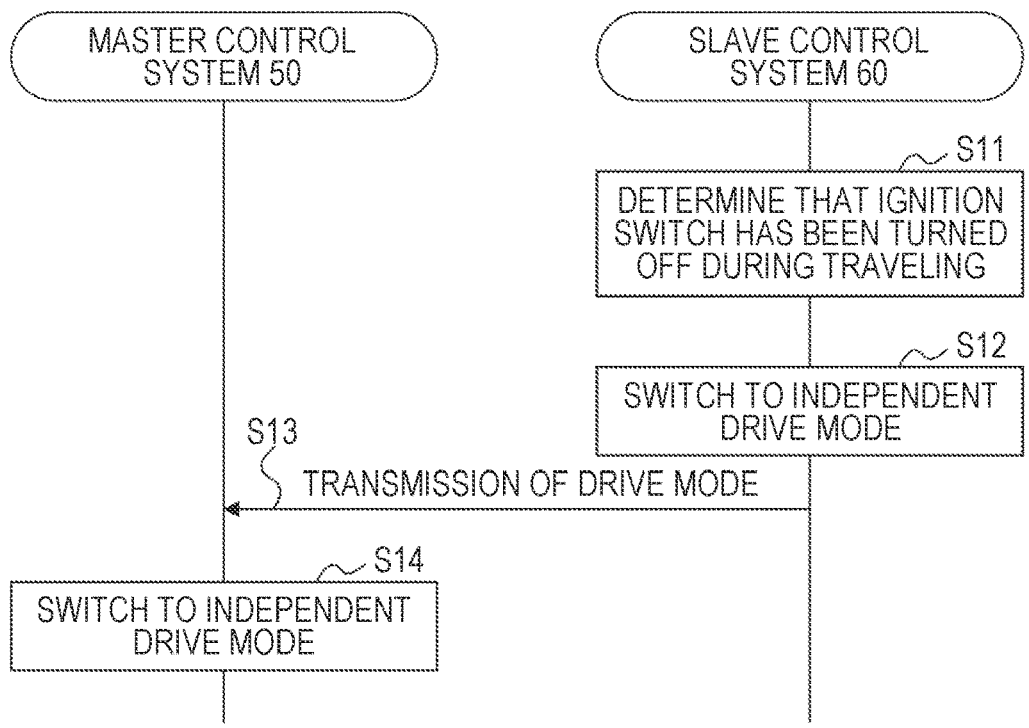
FIG. 6 is a sequence chart illustrating a flow of a drive mode switching process in a master control system when it is determined that an ignition switch has been turned off earlier in the slave control system.

As illustrated in the sequence chart of FIG. 6, when it is determined that the ignition switch 43 has been turned off while the vehicle is traveling (Step S11), the command value difference determining unit 109 of the slave control system 60 switches the drive mode of the slave control system 60 from the cooperative drive mode to the independent drive mode (Step S12). On the other hand, it is not yet determined in the master control system 50 that the ignition switch 43 has been turned off while the vehicle is traveling. The second traveling ignition-off signal Soff2a generated by the second ignition determining unit 102 and the information on the drive mode of the master control system 50 which is received from the first transceiver unit 94 by the second transceiver unit 104 and which indicates that the master control system 50 performs the cooperative drive mode are input to the command value difference determining unit 109 of the slave control system 60. The command value difference determining unit 109 ignores the information indicating that it is not yet determined in the master control system 50 that the ignition switch 43 has been turned off while the vehicle is traveling, gives priority to the information indicating that it is determined in the corresponding control system that the ignition switch 43 has been turned off while the vehicle is traveling, and switches the drive mode of the slave control system 60 from the cooperative drive mode to the independent drive mode.

The second transceiver unit 104 of the slave control system 60 transmits the information on the drive mode of the slave control system 60 to the first transceiver unit 94 of the master control system 50 (Step S13). The master control system 50 switches its own drive mode to the independent drive mode based on the information on the drive mode of the slave control system 60 received from the second transceiver unit 104 by the first transceiver unit 94 (Step S14). In the master control system 50, it is not yet determined that the ignition switch 43 has been turned off while the vehicle is traveling. On the other hand, the information on the drive mode of the slave control system 60 which is received from the second transceiver unit 104 by the first transceiver unit 94 and which indicates that the slave control system 60 performs the independent drive mode is input to the master control system 50. The first status maintaining unit 93 of the master control system 50 ignores the information indicating that it is not yet determined in its own control system that the ignition switch 43 has been turned off, gives priority to the information indicating that it is determined in the slave control system 60 that the ignition switch 43 has been turned off while the vehicle is traveling, and maintains the information on the drive mode indicating that the master control system 50 controls driving of the motor 20 in the independent drive mode.

The drive mode switching process when it is determined in the master control system 50 earlier than in the slave control system 60 that the ignition switch 43 has been turned off while the vehicle is traveling is the same as the process illustrated in FIG. 6. When it is determined that the ignition switch 43 has been turned off while the vehicle is traveling, the master control system 50 switches the drive mode of the master control system 50 from the cooperative drive mode to the independent drive mode. The first transceiver unit 94 of the master control system 50 transmits information on the drive mode of the master control system 50 to the second transceiver unit 104 of the slave control system 60. The command value difference determining unit 109 of the slave control system 60 ignores the information indicating that it is not yet determined in its own control system that the ignition switch 43 has been turned off, gives priority to the information indicating that it is determined in the master control system 50 that the ignition switch 43 has been turned off while the vehicle is traveling, and switches the drive mode to the independent drive mode in which the second adjusted current command value Iq2a* is output. The second status maintaining unit 103 of the slave control system 60 ignores the information indicating that it is not yet determined in its own control system that the ignition switch 43 has been turned off, gives priority to the information indicating that it is determined in the master control system 50 that the ignition switch 43 has been turned off while the vehicle is traveling, and maintains the information on the drive mode indicating that the slave control system 60 controls driving of the motor 20 in the independent drive mode.

As illustrated in FIG. 3, when it is determined that the ignition switch 43 has been turned on in a period in which the adjusted current command value is gradually limited based on inputting of the second traveling ignition-off signal Soff2a, that is, in a period in which the independent drive mode is being performed due to turning-off of the ignition switch 43 while the vehicle is traveling, the command value difference determining unit 109 determines whether a steering operation is being performed. The command value difference determining unit 109 determines whether the steering operation is being performed based on a result of determination on whether the second steering torque Th2 is greater than a torque threshold value Th0, and switches the drive mode of the slave control system 60 based on the result of determination on whether the steering operation is being performed. The torque threshold value Th0 is set to a value of the second steering torque Th2 at which it can be determined that the steering operation is being performed.

Figure 7:
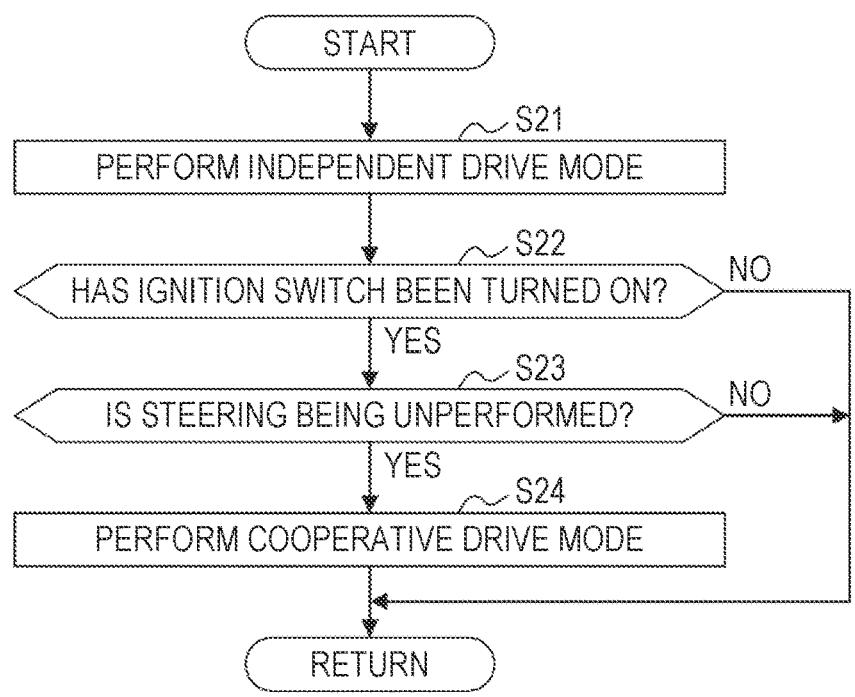
FIG. 7 is a flowchart illustrating a routine of a drive mode switching process in the slave control system.

The process of switching the drive mode of the slave control system 60 will be described below with reference to FIG. 7. It is assumed that the independent drive mode is being performed in the slave control system 60 due to turning-off of the ignition switch 43 while the vehicle is traveling. The slave control system 60 repeatedly performs the following drive mode switching process in a period in which the independent drive mode is being performed due to turning-off of the ignition switch 43 while the vehicle is traveling.

The second ignition determining unit 102 of the slave control system 60 determines whether the ignition switch 43 has been turned on (Step S22) in a period in which the independent drive mode is being performed due to turning-off of the ignition switch 43 while the vehicle is traveling (Step S21). When the second ignition voltage Vg2 is greater than a voltage threshold value V0, the second ignition determining unit 102 determines that the ignition switch 43 has been turned on and generates the first ignition-on signal Son1.

When it is determined in Step S22 that the ignition switch 43 has not been turned on (NO in Step S22), the command value difference determining unit 109 of the slave control system 60 maintains the independent drive mode and ends the drive mode switching process.

When it is determined in Step S22 that the ignition switch 43 has been turned on (YES in Step S22), the command value difference determining unit 109 of the slave control system 60 determines whether a steering operation is being unperformed (Step S23). The command value difference determining unit 109 determines whether a steering operation is being performed based on the result of determination on whether the second steering torque Th2 is greater than the torque threshold value Th0.

When it is determined in Step S23 that a steering operation is being performed (NO in Step S23), the command value difference determining unit 109 of the slave control system 60 maintains the independent drive mode and ends the drive mode switching process. When the second steering torque Th2 is greater than the torque threshold value Th0, the command value difference determining unit 109 determines that a steering operation is being performed and maintains the independent drive mode by outputting the second adjusted current command value Iq2a* to the second guard processing unit 108. The case in which it is determined that a steering operation is being performed includes a situation in which large fluctuation of the adjusted current command value is likely to occur when the drive mode is switched, that is, a situation in which fluctuation of the torque output from the motor 20 is likely to cause the steering wheel 10 to vibrate when the drive mode is switched. When the steering wheel 10 vibrates due to the fluctuation of the torque, it may affect a driver's steering feeling related to the steering wheel 10.

When it is determined in Step S23 that a steering operation is being unperformed (i.e., a steering operation is not being performed) (YES in Step S23), the command value difference determining unit 109 of the slave control system 60 switches the drive mode from the independent drive mode to the cooperative drive mode (Step S24) and then ends the drive mode switching process. When the second steering torque Th2 is not greater than the torque threshold value Th0, the command value difference determining unit 109 determines that a steering operation is not being performed and switches the drive mode from the independent drive mode to the cooperative drive mode by outputting the first adjusted current command value Iq1a* to the second guard processing unit 108. The case in which it is determined that a steering operation is not being performed includes a situation in which large fluctuation of the adjusted current command value is less likely to occur when the drive mode is switched, that is, a situation in which fluctuation of the torque output from the motor 20 is less likely to cause the steering wheel 10 to vibrate when the drive mode is switched.

In this way, in the case in which the ignition switch 43 is turned on in the period in which the independent drive mode is being performed due to turning-off of the ignition switch 43 while the vehicle is traveling, the independent drive mode is maintained when a steering operation is being performed, and the drive mode is switched from the independent drive mode to the cooperative drive mode when a steering operation is not being performed.

As illustrated in FIG. 3, when the drive mode is switched from the independent drive mode to the cooperative drive mode, the command value difference determining unit 109 outputs the first adjusted current command value Iq1a* to the second guard processing unit 108 and outputs a signal indicating that the cooperative drive mode is performed, to the second status maintaining unit 103. The second transceiver unit 104 of the slave control system 60 transmits information on the drive mode of the slave control system 60 to the first transceiver unit 94 of the master control system 50. The master control system 50 switches its own drive mode to the cooperative drive mode based on the information on the drive mode of the slave control system 60 received from the second transceiver unit 104 by the first transceiver unit 94.

Operations of this embodiment will be described below. When the ignition switch 43 has been turned off while the vehicle is traveling, the timings at which the master control system 50 and the slave control system 60 transition to the traveling ignition-off control may be different from each other. This is because the timing at which the first traveling ignition-off signal Soff1 a is generated by the first ignition determining unit 92 and the timing at which the second traveling ignition-off signal Soff2a is generated by the second ignition determining unit 102 are different from each other. One reason thereof is, for example, that a timing at which the third power supply line L3 is switched to the disconnected state by turning off the first power supply relay 55 provided in the master control system 50 and a timing at which the fourth power supply line L4 is switched to the disconnected state by turning off the second power supply relay 65 provided in the slave control system 60 are different from each other. Another reason is that the first ignition voltage Vg1 and the second ignition voltage Vg2 are different from each other due to noise or the like. For these reasons, since the timings at which it is determined that the ignition switch 43 has been turned off are different from each other, one control system of the master control system 50 and the slave control system 60 may transition to the traveling ignition-off control earlier than the other control system. A case in which the master control system 50 transitions to the traveling ignition-off control earlier than the slave control system 60 will be described below with reference to FIG. 8.

Figure 8:
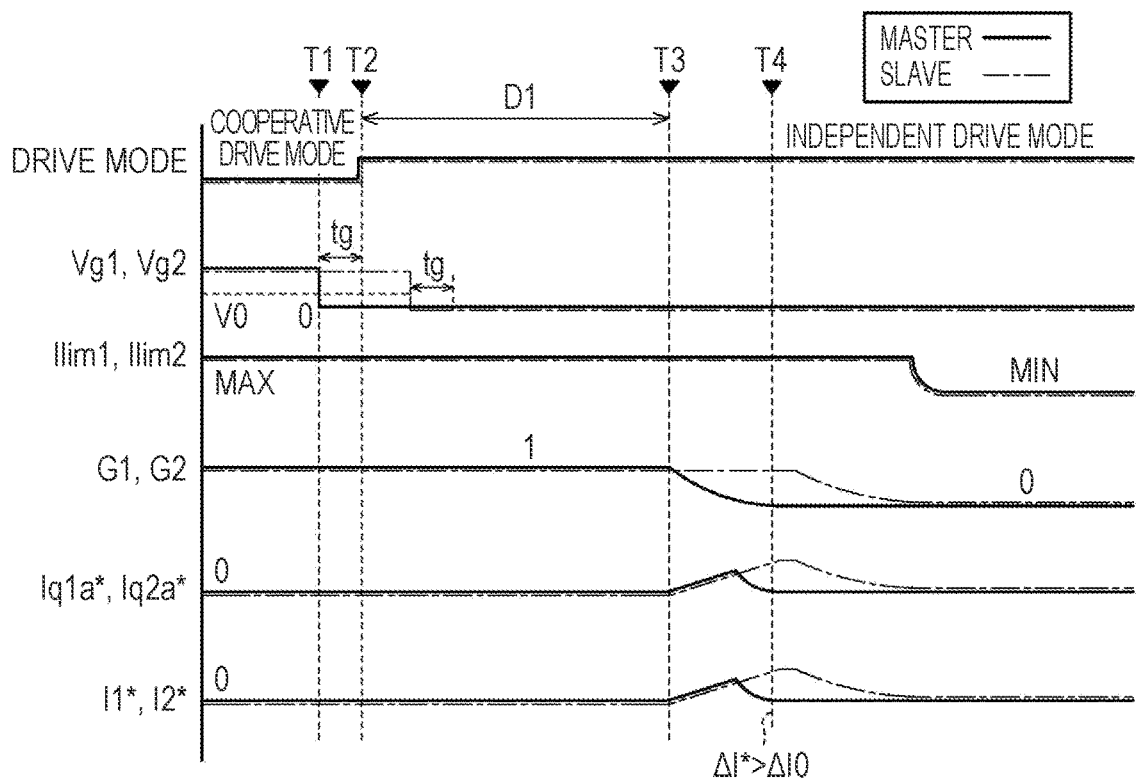
FIG. 8 is a timing chart illustrating internal states when switching from a cooperative drive mode to an independent drive mode is performed due to turning-off of the ignition switch while the vehicle is traveling.

Time T1 in FIG. 8 indicates a time at which the ignition switch 43 is turned off by a driver. Time T2 indicates a time at which both of the master control system 50 and the slave control system 60 transition to the traveling ignition-off control. Time T3 indicates a time at which the assistance duration D1 has elapsed and gradual limiting of the calculated adjusted current command value is started. At time T3, it is assumed that a driver performs a steering operation. Time T4 indicates a time at which the command value difference determining unit 109 determines that the command value difference ΔI* is greater than the difference determination threshold value ΔI0.

As illustrated in FIG. 8, in a period to time T1, the master control system 50 and the slave control system 60 perform the cooperative drive mode. The first ignition voltage Vg1 and the second ignition voltage Vg2 are greater than the voltage threshold value V0. Each of the first current limit value Ilim1 and the second current limit value Ilim2 is set to, for example, a maximum value. The first gain G1 and the second gain G2 are set to "1." The first adjusted current command value Iq1a* and the second adjusted current command value Iq2a* are output to be the same as the first base current command value Iq1* and the second base current command value Iq2*. For the purpose of simplification of description, it is assumed that a driver does not perform a steering operation, that is, the first steering torque Th1 and the second steering torque Th2 are "0."Accordingly, both the first adjusted current command value Iq1a* and the second adjusted current command value Iq2a* are "0." Both the first final current command value I1* and the second final current command value I2* are "0." Since the cooperative drive mode is being performed, the first final current command value I1* and the second final current command value I2* are values which are calculated based on the first adjusted current command value Iq1a*.

At time T1, the ignition switch 43 is turned off by a driver. Here, it is assumed that the first ignition voltage Vg1 of the master control system 50 becomes equal to or less than the voltage threshold value V0 earlier than the second ignition voltage Vg2 of the slave control system 60. At this time, it is assumed that the vehicle speed SPD is greater than the vehicle speed threshold value SPD0. When the situation in which the vehicle speed SPD is greater than the vehicle speed threshold value SPD0 is maintained for the predetermined time tg and a situation in which the first ignition voltage Vg1 is not greater than (i.e., the first ignition voltage Vg1 is equal to or less than) the voltage threshold value V0 is maintained for the predetermined time tg, the first ignition determining unit 92 of the master control system 50 determines that the ignition switch 43 has been turned off while the vehicle is traveling. Accordingly, the master control system 50 switches its drive mode to the independent drive mode. The slave control system 60 switches its drive mode to the independent drive mode based on the information on the drive mode of the master control system 50 received from the first transceiver unit 94 of the master control system 50. Accordingly, at time T2, the master control system 50 and the slave control system 60 switch their drive modes to the independent drive mode. Since the slave control system 60 enters a situation in which the second ignition voltage Vg2 does not exceed the voltage threshold value V0 later than the master control system 50, it is determined later in the slave control system 60 that the ignition switch 43 has been turned off while the vehicle is traveling.

A period from time T2 to time T3 is the assistance duration D1. In the assistance duration D1, since the steering wheel is likely to be steered by a driver, the first gain G1 is maintained as "1." The second gain G2 is also "1."

At time T3, since a driver performs a steering operation, the absolute values of the first adjusted current command value Iq1a* and the second adjusted current command value Iq2a* are greater than "0." At time T3, the assistance duration D1 has elapsed. After time T3, the absolute value of the first gain G1 decreases gradually. The absolute value of the first gain G1 becomes "0" when a predetermined time elapses after the assistance duration D1 has elapsed. The first adjusted current command value Iq1a* is gradually limited with the gradual decreasing of the absolute value of the first gain G1. The first adjusted current command value Iq1a* becomes "0" when a predetermined time elapses after the assistance duration D1 has elapsed. On the other hand, the second gain G2 is yet maintained as "1." Since the second gain G2 is maintained as "1," the second adjusted current command value Iq2a* is not limited yet. Since the independent drive mode is performed, the first final current command value I1* is the same as the first adjusted current command value Iq1a* and the second final current command value I2* is the same as the second adjusted current command value Iq2a*.

At time T4, the command value difference ΔI* becomes greater than the difference determination threshold value ΔI0. However, since the master control system 50 and the slave control system 60 switch their drive modes to the independent drive mode at time T2, switching of the drive mode is not performed at time T4. For example, after time T4, a predetermined time elapses after the assistance duration D1 has elapsed. In this case, after time T4, the absolute value of the second gain G2 decreases gradually, and the second adjusted current command value Iq2a* and the second final current command value I2* are gradually limited with the gradual decreasing of the absolute value of the second gain G2. After time T4, the absolute values of the first current limit value Ilim1 and the second current limit value Ilim2 decrease gradually and are set to minimum values.

In this way, when it is determined that the ignition switch 43 has been turned off while the vehicle is traveling, the drive mode is switched from the cooperative drive mode to the independent drive mode regardless of whether the adjusted current command values calculated by the microcomputers of the master control system 50 and the slave control system 60 are different from each other. That is, as compared to a case where the drive mode is switched from the cooperative drive mode to the independent drive mode after the adjusted current command values calculated by the microcomputers of the master control system 50 and the slave control system 60 have become different from each other, the master control system 50 and the slave control system 60 can switch their drive modes to the independent drive mode early. Accordingly, even when the command values based on a driver's steering are respectively calculated by the control units of the control systems in ignition-off control (i.e., control that is performed due to the turning-off of the ignition switch), it is possible to prevent a situation where the control for supply of electric power to each control system fluctuates between the control using the limited command value and the control using the non-limited command value.

Figure 9:
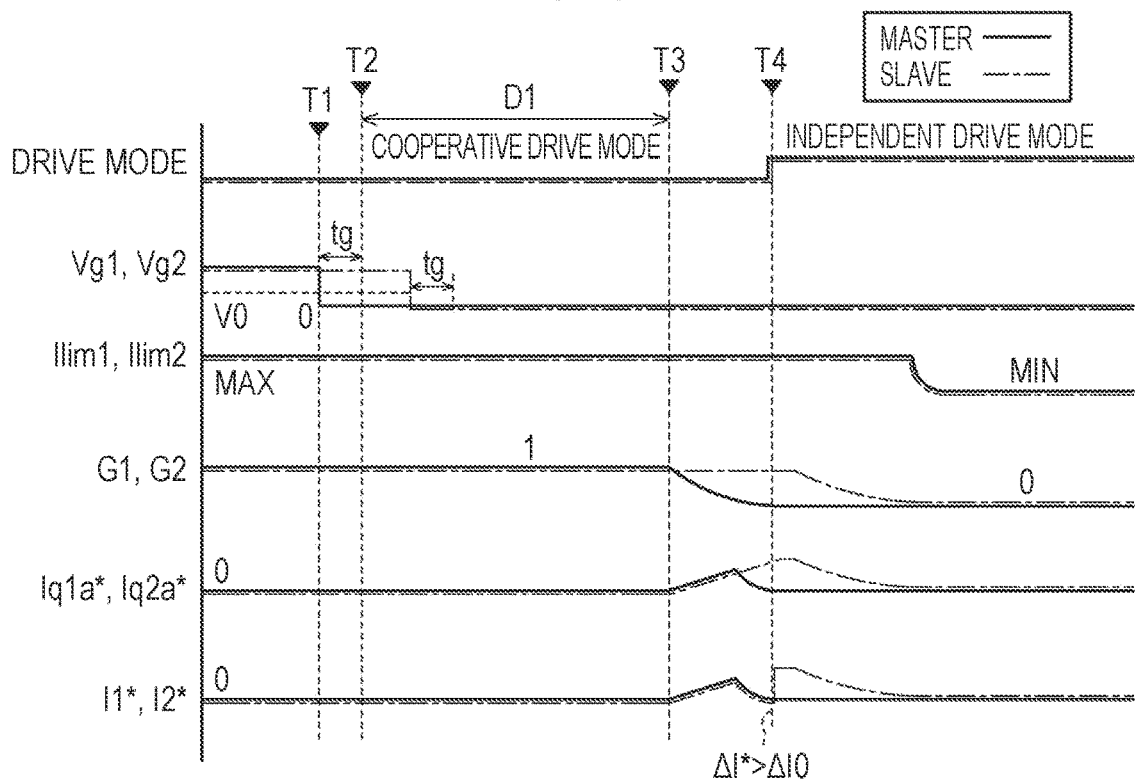
FIG. 9 is a timing chart illustrating internal states when switching from a cooperative drive mode to an independent drive mode due to turning-off of the ignition switch while the vehicle is traveling is not performed in a comparative example.

On the other hand, an example in which the drive mode is not switched from the cooperative drive mode to the independent drive mode even when it is determined that the ignition switch 43 has been turned off while the vehicle is traveling as illustrated in FIG. 9 will be described below as a comparative example.

A period to time T1 is the same as in this embodiment. Time T1 is the same as in this embodiment. At time T2, when the situation in which the vehicle speed SPD is greater than the vehicle speed threshold value SPD0 is maintained for the predetermined time tg and the situation in which the first ignition voltage Vg1 is not greater than the voltage threshold value V0 is maintained for the predetermined time tg, the first ignition determining unit 92 of the master control system 50 detects that the ignition switch 43 has been turned off while the vehicle is traveling. However, in the comparative example, at time T2, the master control system 50 does not switch its drive mode to the independent drive mode. At time T2, the slave control system 60 does not also switch its drive mode to the independent drive mode. The period from time T2 to time T3 is the same as in this embodiment except that the master control system 50 and the slave control system 60 are maintained in the cooperative drive mode. At time T3, since a driver has performed a steering operation, the absolute values of the first adjusted current command value Iq1$a$* and the second adjusted current command value Iq2$a$* are greater than "0." The first adjusted current command value Iq1$a$* is gradually limited with the gradual decreasing of the first gain G1. On the other hand, since the second gain G2 is maintained as "1," the second adjusted current command value Iq2$a$* is not limited yet. Accordingly, at time T4, the command value difference ΔI* becomes greater than the difference determination threshold value ΔI0. Then, based on the determination result from the command value difference determining unit 109 indicating that the command value difference ΔI* is greater than the difference determination threshold value ΔI0, the master control system 50 and the slave control system 60 switch their drive modes to the independent drive mode. In this regard, the control for supply of electric power to the master control system 50 does not change from the control using the limited first adjusted current command value Iq1$a$* calculated by the master control system 50 before and after the drive mode is switched to the independent drive mode. That is, the adjusted current command value input to the first guard processing unit 98 does not change from the first adjusted current command value Iq1$a$* before and after the drive mode is switched to the independent drive mode. On the other hand, before and after the drive modes is switched to the independent drive mode, the control for supply of electric power to the slave control system 60 changes from the control using the limited first adjusted current command value Iq1$a$* calculated by the master control system 50 to the control using the limited second adjusted current command value Iq2$a$* calculated by the slave control system 60. That is, before and after the drive mode is switched to the independent drive mode, the adjusted current command value input to the second guard processing unit 108 changes from the first adjusted current command value Iq1$a$* to the second adjusted current command value Iq2$a$*. Accordingly, the second motor control signal Sm2 may change and the torque output from the motor 20 may fluctuate.

Advantages of this embodiment will be described below. (1) When the ignition switch 43 has been turned off while the vehicle is traveling, the drive mode is switched from the cooperative drive mode to the independent drive mode regardless of whether the adjusted current command values calculated by the microcomputers of the control systems are different from each other. Accordingly, when the ignition switch 43 has been turned off while the vehicle is traveling, it is possible to curb fluctuation of the torque output from the motor 20.

(2) Since the master control system 50 and the slave control system 60 independently determine whether the ignition switch 43 has been turned off while the vehicle is traveling, the timings at which the master control system 50 and the slave control system 60 transition to the traveling ignition-off control may be different from each other. Accordingly, the timings at which the master control system 50 and the slave control system 60 switch their drive modes from the cooperative drive mode to the independent drive mode may be different from each other. The master control system 50 switches its drive mode from the cooperative drive mode to the independent drive mode based on information on the drive mode received from the slave control system 60. The slave control system 60 switches its drive mode from the cooperative drive mode to the independent drive mode based on information on the drive mode received from the master control system 50. Accordingly, in comparison with a case in which the control systems independently determine whether the ignition switch 43 has been turned off while the vehicle is traveling and then independently switch their drive modes to the independent drive mode, it is possible to match the timings at which the drive mode is switched to the independent drive mode in the control systems. As a result, it is possible to stabilize the torque output from the motor 20.

(3) The master control system 50 and the slave control system 60 maintain the independent drive mode in a situation in which fluctuation of the torque of the motor 20 due to switching of the drive mode is likely to cause the steering wheel 10 to vibrate even when the ignition switch 43 is turned on in the period in which the traveling ignition-off control is being performed. In this case, since the master control system 50 and the slave control system 60 do not switch their drive modes, it is possible to curb fluctuation of the torque output from the motor 20. Accordingly, it is possible to reduce the possibility that the fluctuation of the torque affects a driver's steering feeling related to the steering wheel 10 by causing the steering wheel 10 to vibrate. When the ignition switch 43 is turned on in a period in which the traveling ignition-off control is being performed, the master control system 50 and the slave control system 60 switches their drive modes to the cooperative drive mode in a situation in which the fluctuation of the torque from the motor 20 due to switching of the drive mode is less likely to cause the steering wheel 10 to vibrate. In this case, the master control system 50 and the slave control system 60 can switch the drive mode to the cooperative drive mode in a state in which fluctuation of the torque output from the motor 20 is curbed.

(4) The case in which it is determined that the steering wheel 10 is being steered is a situation in which fluctuation of the adjusted current command value is likely to occur when the drive mode is switched, that is, a situation in which fluctuation of the torque output from the motor 20 is likely to cause the steering wheel 10 to vibrate. The case in which it is determined that the steering wheel 10 is not being steered is a situation in which fluctuation of the adjusted current command value is less likely to occur when the drive mode is switched, that is, a situation in which fluctuation of the torque output from the motor 20 is less likely to cause the steering wheel 10 to vibrate. In this way, it is possible to appropriately switch the drive mode by switching the drive mode based on whether the steering wheel 10 is being steered.

The aforementioned embodiment may be modified as follows. The following modified examples may be combined unless technical conflictions arise. The function of the master control system 50 and the function of the slave control system 60 may be exchanged with each other. That is, when the first adjusted current command value Iq1a* of the master control system 50 is abnormal, the slave control system 60 may serve as a master control system, and the master control system 50 may serve as a slave control system. In this case, in the cooperative drive mode, supply of electric power to both the master control system 50 and the slave control system 60 may be performed based on the current command value calculated by the slave control system 60.

In the aforementioned embodiment, the command value difference determining unit 109 is provided in only the slave control system 60, but the command value difference determining unit may be provided in the master control system 50 in addition to the slave control system 60. Each of the control systems may switch the drive mode thereof based on the determination result from the command value difference determining unit of the control system. In this case, one control system may not transmit the drive mode thereof to the other control system.

The methods of determining the state of the ignition switch 43 which are performed by the first ignition determining unit 92 and the second ignition determining unit 102 can be appropriately changed. For example, the first ignition determining unit 92 may use a determination condition regarding whether communication with another device has been cut off instead of the determination condition regarding whether the first ignition voltage Vg1 is greater than the voltage threshold value V0. The first ignition determining unit 92 determines that state of the ignition switch 43 when the determination conditions are satisfied or not satisfied continuously for the predetermined time tg, but may determine the state of the ignition switch 43 immediately after the determination conditions are satisfied or not satisfied.

The master control system 50 and the slave control system 60 may switch their drive modes to, for example, another drive mode in which the motor 20 is driven by only one normal control system of the master control system 50 and the slave control system 60 when an abnormality has occurred in the other control system, in addition to the cooperative drive mode and the independent drive mode.

The first microcomputer 52 acquires the voltage of the first power supply 70 as the first ignition voltage Vg1 via the first voltage sensor 56, but may directly acquire the voltage from the first power supply 70. The second microcomputer 62 acquires the voltage of the second power supply 80 as the second ignition voltage Vg2 via the second voltage sensor 66, but may directly acquire the voltage from the second power supply 80.

The first gain output unit 96 exponentially decreases the absolute value of the first gain G1 after the assistance duration D1 has elapsed, but the mode of gradually decreasing the absolute value of the first gain G1 can be appropriately changed. For example, the first gain output unit 96 may decrease the absolute value of the first gain G1 in proportion to a period of time after the assistance duration D1 has elapsed, or may decrease the absolute value of the first gain G1 stepwise according to the period of time after the assistance duration D1 has elapsed. That is, the first gain output unit 96 may decrease the absolute value more gradually in comparison with a case in which the first gain G1 is sharply changed from "1" to "0" after the assistance duration D1 has elapsed. The mode of calculating the second gain G2 which is performed by the second gain output unit 106 can also be appropriately changed similarly to the first gain output unit 96.

The first gain output unit 96 performs gradual decreasing of the absolute value of the first gain G1 after the assistance duration D1 has elapsed, but the disclosure is not limited thereto. The first gain output unit 96 may perform gradual decreasing of the absolute value of the first gain G1 when the first traveling ignition-off signal Soff1a is input. That is, the assistance duration D1 may not be provided. The disclosure is not limited to the configuration in which the absolute value of the second gain G2 output from the second gain output unit 106 is gradually decreased after the assistance duration D1 has elapsed, similarly to the case of the first gain output unit 96.

The first gain output unit 96 performs gradual decreasing of the absolute value of the first gain G1 only when the first traveling ignition-off signal Soff1a is input, but may also perform the gradual decreasing when the first ignition-off signal Soff1 is input. Gradual decreasing of the absolute value of the second gain G2 output from the second gain output unit 106 may be performed when the first ignition-off signal Soff1 is input, similarly to the case of the first gain output unit 96.

A power supply path to the master control system 50 can be appropriately changed. A power supply path to the slave control system 60 can also be appropriately changed. For example, the first power supply 70 connected to the first ECU 51 and the second power supply 80 connected to the second ECU 61 are different power supplies, but may be a shared power supply.

The command value difference determining unit 109 determines whether the first adjusted current command value Iq1a* and the second adjusted current command value Iq2a* are different from each other, but the disclosure is not limited thereto. The command value difference determining unit 109 may perform determination regarding the difference based on other command values such as voltage command values.

The command value difference determining unit 109 determines whether the drive mode of the slave control system 60 is to be switched based on the second steering torque Th2 when it is determined that the ignition switch 43 has been turned on in the period in which the independent drive mode is performed due to turning-off of the ignition switch 43 while the vehicle is traveling, but the disclosure is not limited thereto. For example, the command value difference determining unit 109 may determine whether the drive mode of the slave control system 60 is to be switched based on the first steering torque Th1, based on a rotation speed which is a rate of change of the first rotation angle θ1 or the second rotation angle θ2, or based on the command value difference ΔI*. That is, the command value difference determining unit 109 may perform the determination based on any state quantity as long as it is a state quantity with which it can be determined whether a difference between a command value used in the independent drive mode and a command value used in the cooperative drive mode is small.

For example, the command value difference determining unit 109 may determine whether the drive mode of the slave control system 60 is to be switched based on a result of determination indicating that the difference between the command value used in the independent drive mode and the command value used in the cooperative drive mode is less than a predetermined value. The predetermined value is set to a difference with which the adjusted current command value used in the independent drive mode and the adjusted current command value used in the cooperative drive mode can be determined to match. In a situation in which a driver's steering operation is not performed, since the first steering torque Th1 and the second steering torque Th2 are substantially zero, the command value difference ΔI* between the first adjusted current command value Iq1a* and the second adjusted current command value Iq2a* is assumed to be substantially zero.

The command value difference determining unit 109 performs switching to the cooperative drive mode based on the condition that the steering operation is not performed, when it is determined that the ignition switch 43 has been turned on in the period in which the independent drive mode is performed due to turning-off of the ignition switch 43 while the vehicle is traveling, but the disclosure is not limited thereto. For example, the command value difference determining unit 109 may perform switching to the cooperative drive mode based on the condition that the difference between the command value used in the independent drive mode, that is, the command value of the slave control system 60, and the command value used in the cooperative drive mode, that is, the command value of the master control system 50, is less than a predetermined value. The predetermined value may be set to a value in a range in which an influence on the steering wheel 10 is small, the range being experimentally acquired.

The mechanical configuration of the motor 20 may include one system. For example, the coil 25 may include only one of the first coil 25a and the second coil 25b, and the master control system 50 and the slave control system 60 may control a current supplied to the same coil.

In the aforementioned embodiment, the EPS 1 to which the steering control device 30 is applied is configured as an EPS that applies a torque of the motor 20 to the steering shaft 11 via the speed reduction mechanism 22, but the disclosure is not limited thereto. The EPS 1 may be configured as, for example, an EPS that applies the torque of the motor 20 to the rack shaft 12 via a ball screw mechanism. The steering control device 30 is not limited to a steering control device applied to the EPS, but may be applied to a steer-by-wire system with a link in which transmission of power between a steering side and a turning side can be allowed and cut off using a clutch or a linkless steer-by-wire system in which transmission of power between the steering side and the turning side is cut off.

What is claimed is:

1. A steering control device comprising:
    a plurality of control systems configured to control driving of a motor that is coupled to a steering system of a vehicle by switching between a plurality of drive modes including a cooperative drive mode and an independent drive mode, wherein
    each of the control systems includes a control unit configured to calculate a command value for controlling the motor,
    the control systems are configured to control the driving of the motor based on the command value calculated by the control unit of one control system of the control systems when the cooperative drive mode is performed,
    the control systems are configured to control the driving of the motor based on the command values respectively calculated by the control units of the control systems when the independent drive mode is performed,
    the control systems are configured to switch the drive mode to the cooperative drive mode when the command values calculated by the control units of the control systems are not different from each other and to switch the drive mode to the independent drive mode when the command values calculated by the control units of the control systems are different from each other,
    the control systems are configured to gradually limit the command values respectively calculated by the control units of the control systems when a start switch of the vehicle is turned from on to off, and
    the control systems are configured to switch the drive mode to the independent drive mode when the start switch is turned from on to off while the vehicle is traveling regardless of whether the command values calculated by the control units of the control systems are different from each other.

2. The steering control device according to claim 1, wherein:
    the control systems are configured to determine whether the start switch has been turned off while the vehicle is traveling;
    each of the control systems is configured to transmit information on the drive mode of the control system to each of a remainder of the control systems and to receive information on the drive mode of each of the remainder of the control systems; and
    when one control system of the control systems switches the drive mode to the independent drive mode due to turning-off of the start switch while the vehicle is traveling, the one control system transmits information on the drive mode indicating that the one control system has been switched to the independent drive mode to each of a remainder of the control systems, and each of the remainder of the control systems receives the information on the drive mode from the one control system of the control systems, and switches the drive mode to the independent drive mode based on the information on the drive mode received from the one control system.

3. The steering control device according to claim 1, wherein the control systems are configured to maintain the independent drive mode in a situation in which fluctuation of a torque of the motor due to switching of the drive mode is likely to cause a steering wheel of the vehicle to vibrate, and to switch the drive mode to the cooperative drive mode in a situation in which the fluctuation of the torque of the motor due to the switching of the drive mode is less likely to cause the steering wheel to vibrate, when the start switch is turned on in a period in which the drive mode is the independent drive mode due to turning-off of the start switch while the vehicle is traveling.

4. The steering control device according to claim 3, wherein:
- the control systems are configured to determine that the fluctuation of the torque of the motor due to the switching of the drive mode is likely to cause the steering wheel to vibrate and to maintain the independent drive mode when the steering wheel is being steered; and
- the control systems are configured to determine that the fluctuation of the torque of the motor due to the switching of the drive mode is less likely to cause the steering wheel to vibrate and to switch the drive mode to the cooperative drive mode when the steering wheel is not being steered.

* * * * *